US007865820B2

(12) United States Patent
Sauer et al.

(10) Patent No.: US 7,865,820 B2
(45) Date of Patent: Jan. 4, 2011

(54) GENERATING A BUSINESS DOCUMENT MODEL

(75) Inventors: Manuel Sauer, Isny (DE); Ulrike Greiner, Eggenstein-Leopoldshafen (DE)

(73) Assignee: SAP AG, Walldorf (DE)

( * ) Notice: Subject to any disclaimer, the term of this patent is extended or adjusted under 35 U.S.C. 154(b) by 1163 days.

(21) Appl. No.: 11/468,201

(22) Filed: Aug. 29, 2006

(65) Prior Publication Data

US 2008/0059945 A1 Mar. 6, 2008

(51) Int. Cl.
*G06F 17/20* (2006.01)
(52) U.S. Cl. ...................................... 715/234
(58) Field of Classification Search .................. 715/234
See application file for complete search history.

(56) References Cited

U.S. PATENT DOCUMENTS

| | | | |
|---|---|---|---|
| 6,237,136 B1 | 5/2001 | Sadahiro | |
| 6,684,388 B1 | 1/2004 | Gupta et al. | |
| 6,772,216 B1 * | 8/2004 | Ankireddipally et al. | 709/230 |
| 2002/0055886 A1 * | 5/2002 | Hinckley | 705/26 |
| 2002/0103869 A1 | 8/2002 | Goatly et al. | |
| 2002/0143742 A1 * | 10/2002 | Nonomura et al. | 707/1 |
| 2002/0147711 A1 * | 10/2002 | Hattori et al. | 707/3 |
| 2003/0115037 A1 * | 6/2003 | Sumida | 703/22 |
| 2003/0149934 A1 * | 8/2003 | Worden | 715/513 |
| 2003/0195885 A1 * | 10/2003 | Emmick et al. | 707/8 |
| 2004/0034651 A1 * | 2/2004 | Gupta et al. | 707/102 |
| 2004/0122831 A1 | 6/2004 | Ha et al. | |
| 2004/0230572 A1 * | 11/2004 | Omoigui | 707/3 |
| 2005/0114148 A1 | 5/2005 | Hinkelman | |
| 2005/0154690 A1 * | 7/2005 | Nitta et al. | 706/46 |
| 2006/0080338 A1 | 4/2006 | Seubert et al. | |
| 2006/0085336 A1 * | 4/2006 | Seubert et al. | 705/40 |
| 2006/0085450 A1 * | 4/2006 | Seubert et al. | 707/100 |

(Continued)

FOREIGN PATENT DOCUMENTS

WO   WO 01/25860   4/2001

(Continued)

OTHER PUBLICATIONS

Martinez et al., A Method for the Dynamic Generation of Virtual Versions of Evolving Documents, pp. 476-482 (ACM, SAC 2002, Madrid, Spain, 2002).*

(Continued)

*Primary Examiner*—Doug Hutton
*Assistant Examiner*—Frank D Mills
(74) *Attorney, Agent, or Firm*—Fish & Richardson P.C.

(57) ABSTRACT

A computer-implemented method for identifying a substitute relating to a business document model includes receiving, in a computer system that has a modeling tool, a first user input indicating one of multiple components of a business document model in the modeling tool. The multiple components include nodes and edges that represent semantics of a business document. The method includes identifying, in response to the first user input, at least one substitute component for the indicated component. The at least one substitute component is identified in a repository of preexisting business document models and using a graph structure of the business document model. The method includes presenting the identified at least one substitute component in the modeling tool such that a user can replace the indicated component with the substitute component. Quality values can be determined and assigned.

17 Claims, 10 Drawing Sheets

U.S. PATENT DOCUMENTS

| | | | |
|---|---|---|---|
| 2006/0101068 | A1 | 5/2006 | Stuhec et al. |
| 2007/0016593 | A1* | 1/2007 | Lieske et al. ................ 707/100 |
| 2007/0150387 | A1* | 6/2007 | Seubert et al. ................ 705/31 |
| 2007/0198915 | A1* | 8/2007 | Hiyama et al. .............. 715/513 |
| 2007/0208995 | A1* | 9/2007 | Hiyama et al. .............. 715/513 |

FOREIGN PATENT DOCUMENTS

| | | |
|---|---|---|
| WO | WO 2005/055001 | 6/2005 |
| WO | WO 2005/076900 | 8/2005 |

OTHER PUBLICATIONS

Jouve et al., Conceptual Framework for Document Semantic Modelling: An Application to Document and Knowledge Management in the Legal Domain, pp. 345-375 (Elsvier B.V., Data & Knowledge Engineering vol. 46, 2003).*

Ko et al., Semantically-Based Active Document Collection Templates for Web Information Management Systems, pp. 1-22 (Electronic Transactions on Artificial Intelligence, vol. 5, Section D, 2001).*

Aiello et al., "Document understanding for a broad class of documents", *International Journal on Document Analysis and Recognition*, 2002, 5:1-16.

"ARIS Platform Product Brochure," IDS Scheer, Saarbrucken, Germany, 2006, 28 pages.

'A Semantic Web Approach for Adaptive Hypermedia' [online]. Garlatti and Iksal, 2003 [retrieved on Aug. 14, 2006]. Retrieved from the Internet: <URL: wwwis.win.tue.nl/ah2003/proceedings/www-1/>, 10 pages.

'Dare to script tree-based XML with Perl' [online]. Darugar (IBM), 2000 [retrieved on Aug. 14, 2006]. Retrieved from the Internet: <URL: www-128.ibm.com/developerworks/library/xml-perl2/>, 7 pages.

P.T. Cox et al., "Prograph: a step towards liberating programming from textual conditioning," *IEEE Workshop on Visual Languages*, Rome, Italy, 1989, pp. 150-156.

A.M. Zaremski, "Specification matching on software componets," *ACM Transactions on Software Engineering and Methodology*, 1997, 6(4): 333-369.

* cited by examiner

GENERATING A BUSINESS DOCUMENT MODEL

TECHNICAL FIELD

This document relates to business document models.

BACKGROUND

Many aspects of electronic communication, and in particular electronic commerce, are based on business documents that parties can exchange over a computer connection. A big problem in current e-Business is the variety in structure and description of business information and business documents. The absence of uniform and standardized methods for the common representation of the structure and semantics of business data led to today's situation where there is an increasing growth of different representations of electronic business information and documents. There are today many Business-to-Business (B2B) electronic commerce standards addressing diverse aspects of the standardization issue. A B2B interoperability standard in general involves the description of the message formats exchanged, bindings to transport protocols, the sequencing of messages, and security issues. A world-wide accepted syntax for representation exists with extensible markup language (XML), but this does not solve the problem of non-uniform semantics and structure.

Some business documents are based on reusable building blocks that define the semantics of the document data. An example of a standard that defines such building blocks is the electronic business XML (ebXML) Core Components Technical Specification issued by the United Nations Centre for Trade Facilitation and Electronic Business, which specification is hereafter referred to as CCTS. The semantic building blocks defined by the CCTS are the foundation for human legibility and automatic machine processing so that an integrated interoperability can be guaranteed. The CCTS based building blocks are syntax free and very flexible, because they are based on a modular concept. Business information can be assembled for all demands by reusable building blocks. "Syntax free" means that these building blocks can be generated in form of a generic model which can then be exported to arbitrary representations, like XML, ABAP Objects or Java classes.

SUMMARY

The invention relates to generating a business document model. In a first general aspect, a computer-implemented method for identifying a substitute relating to a business document model includes receiving, in a computer system that has a modeling tool, a first user input indicating one of multiple components of a business document model in the modeling tool. The multiple components include nodes and edges that represent semantics of a business document. The method includes identifying, in response to the first user input, at least one substitute component for the indicated component. The at least one substitute component is identified in a repository of preexisting business document models and using a graph structure of the business document model. The method includes presenting the identified at least one substitute component in the modeling tool such that a user can replace the indicated component with the substitute component.

Implementations can include any or all of the following features. A user can create the business document model in the modeling tool and make the first user input by selecting the one of the multiple components, and the identification of the at least one substitute component can be automatically triggered by the selection. Using the graph structure can include traversing at least part of the business document model based on the indicated component and attempting to identify those of the multiple components encountered in the traversal. The method can further include terminating the traversal upon traversing a final component, the termination can be based on a condition selected from the group consisting of: any parent or child component of the final component has already been traversed, and an identifier of the final block is known. The method can further include selecting a starting point for the traversal among the multiple components based on closeness to the indicated component in the graph structure. Identifying the at least one substitute component can include identifying, for each traversed component, at least one best matching component in the repository. The at least one best matching component for at least one of the traversed components can be identified using local information. The local information can include an attribute value of the traversed component and a parent or child relationship of the traversed component. The method can further include adjusting quality values associated with the respective best matching components. The quality values can be adjusted while again traversing the traversed components in reverse order. The method can further include adjusting a quality value for the substitute component based on a quality of the best matching components for the traversed components. An attribute of any of the traversed components can be used in identifying the best matching components. The identification of at least one of the best matching components can be performed after a determination that the graph structure does not exactly match a structure of the preexisting business models. The method can further include presenting a quality value with the substitute component, the quality value can represent a determination of a quality of the substitute component as a replacement for the indicated component.

In a second general aspect, a computer program product is tangibly embodied in an information carrier and includes instructions that, when executed, generate on a display device a graphical user interface for identifying a substitute relating to a business document model. The graphical user interface includes a modeling area configured to present multiple components of a business document model. The multiple components include nodes and edges that represent semantics of a business document. The graphical user interface includes a substitution candidate area for presenting at least one substitute component such that a user can replace an indicated one of the multiple components in the business document model with the substitute component. The at least one substitute component is identified in a repository of preexisting business document models and using a graph structure of the business document model.

Implementations can include the following feature. The substitution candidate area can further be configured to present a quality value with the substitute component, and the quality value can represent a determination of a quality of the substitute component as a replacement for the indicated component.

Advantages of implementations can include any or all of the following. Providing an improved substitute identification approach. Providing a substitute identification approach that can identify substitutes although the graph structure of the business document being modeled does not exactly match a structure of the preexisting business models. Providing a substitute identification approach that can identify substitutes although the graph structure is incomplete, contains modeling mistakes, or contains new components compared to the structure of the preexisting business models.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
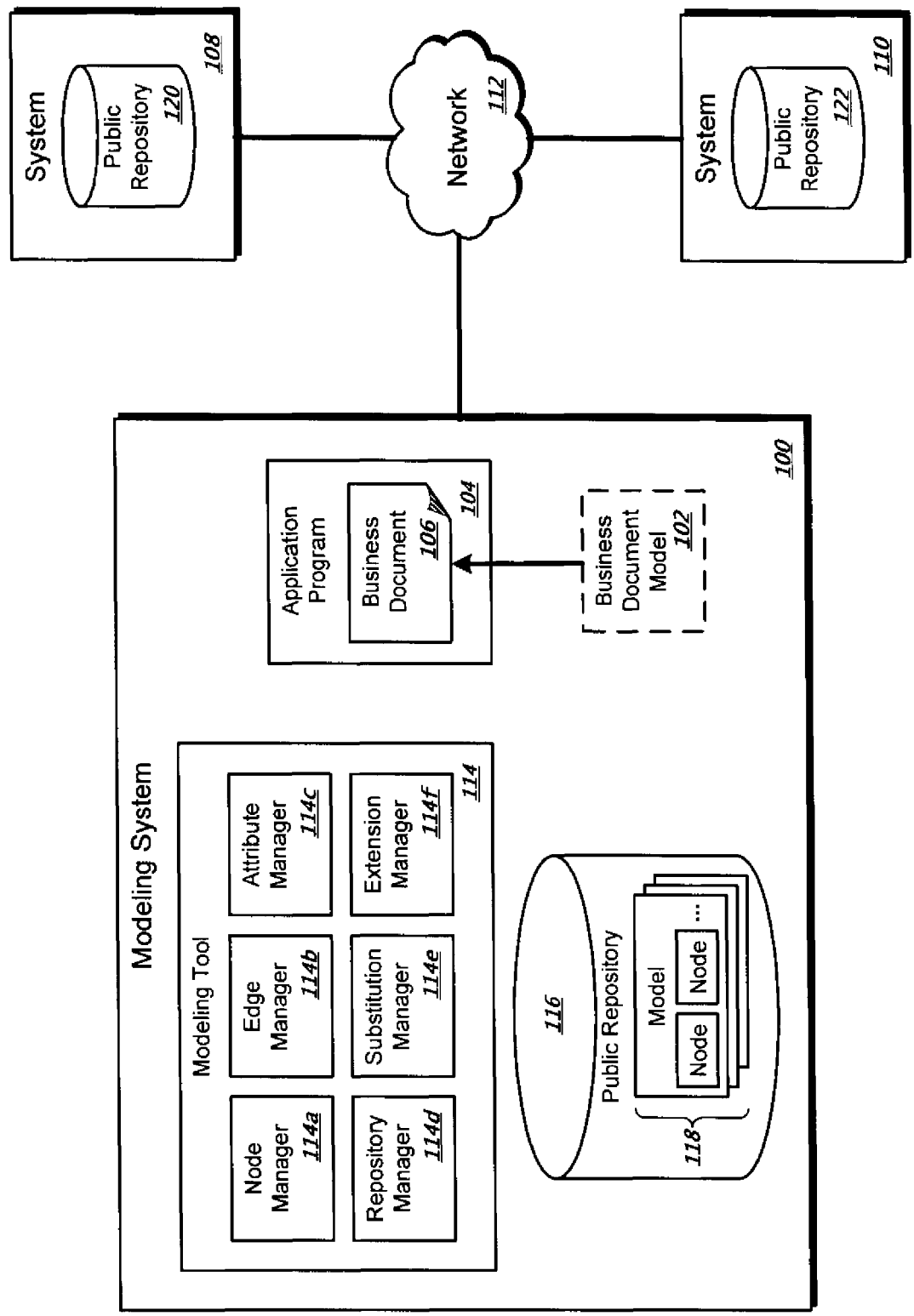
FIG. 1 is a block diagram of an exemplary system that can generate a business document model.

FIG. 1 shows an example of a modeling system 100 that can be used for generating a business document model 102. As used herein, a business document model means a semantic model that can be used in generating one or more documents to be exchanged in electronic communication. Here, the modeling system 100 includes at least one application program 104 having defined for it an electronic document 106 based on the model 102. Particularly, the program 104 is configured to communicate with other components in the system or remotely, and can forward or receive the document 106 as part of such communications. The modeling system can be connected to one or more other systems 108, 110 through a network 112, such as a local area network or the internet. Here, the other systems are also configured for electronic communication using the same business document model 102, for example because they have respective application programs configured similarly to the program 104. This means that when either of these systems receives a document that has the model 102, the system will be able to automatically detect the semantics As such, the system 100 can engage in electronic communication using the document 106 (and others with the same model) with any or both of the systems 108, 110 over the network 112.

Here, the modeling system 100 includes a modeling tool 114 for generating business document models, including the business document model 102. The tool 114 provides a modeling environment that is at once generic and thus applicable to many different situations, and intuitive and supportive of the modeling process. For example, the modeling tool 114 can generate a graphical user interface (GUI) for the system 100 where a user can assemble nodes and edges (to be described below) into a directed graph that is then stored as the model for the business document. For example, the graphs for models that have been created can be stored in a repository 116 that is accessible to the system 100.

The modeling tool 114 here includes a node manager 114a providing that the user can add one or more nodes to the model being generated, so that the nodes will be included in the directed graph. For example, as will be described in an example below, the node manager 114a can generate a portion of a GUI where the user selects between initial nodes for creating the model. The node manager also provides editing of the nodes included in the model, for example to remove a node.

The modeling tool 114 here includes an edge manager 114b providing that the user can add one or more edges to the model being generated, and selectively associate the added edge to at least one of the nodes to generate the directed graph. For example, as will be described in an example below, the edge manager 114b can generate a portion of a GUI where the user selects between at least one edge for creating the model. In some implementations, the edge manager provides that the user can add a generic edge to the model being generated, and the edge manager automatically applies the correct type of edge based on the node(s) it should be associated with. The edge manager also provides editing of the edges included in the model, for example to remove an edge.

The modeling tool 114 here includes an attribute manager 114c providing that the user can specify any or all initial nodes generated with the node manager 114a. For example, as will be described in an example below, the attribute manager 114c can generate a portion of a GUI where the user can edit one or more attribute values for any of the nodes that are to be included in the model.

The modeling tool 114 here includes a repository manager 114d managing the repository 116. For example, the repository manager 114d can provide the tool 114 (and, generally, the user) access to any and all preexisting models 118 stored in the repository. For example, as will be described in an example below, the repository manager 114d can generate a portion of a GUI where the user can review one or more nodes from existing models and select any of them to be included in the model being generated. In some implementations, a selected node from the repository can be extended using the repository manager 114d. To extend a node means to determine and display the descendent nodes of a selected node. For example, if a user selects a node "Purchase Order," the repository manager can retrieve the child nodes "Order ID," "Delivery Address" and "Ordered Items," and the children of these nodes, and so on.

The repository 116 can be implemented using MySQL, to name one example. In some implementations, the repository manager 114d works in connection with a separate database management system that manages the repository 116. Multiple repositories can be connected.

The modeling tool 114 here includes a substitution manager 114e providing that an initial node selected by the user can be automatically replaced with a substitute node obtained from the repository 116 using one or more aspects of the model that the user is creating. For example, as will be described in an example below, the substitution manager 114e can generate a portion of a GUI where the user can review one or more proposed substitute nodes from existing models and select any of them to be included in the model being generated.

The modeling tool 114 here includes an extension manager 114f providing that the user can create an extension to any preexisting model, such as one of the models 118, or a model in a private repository 120 that the system 100 has access to, or a model in a public repository 122. For example, the system 100 can make the created extension available to the public or store it as a private extension to the other (private or public) preexisting model.

The modeling tool 114 is here described as having several separate components. One or more of these components could be implemented separately from the modeling tool. In other implementations, the tool could be integrated and not have separately identifiable components. Also, in other implementations, the application program(s) 106 that uses the generated model 102 can be executed in a system that is separate from the system 100 that generates the model 102.

Figure 2:
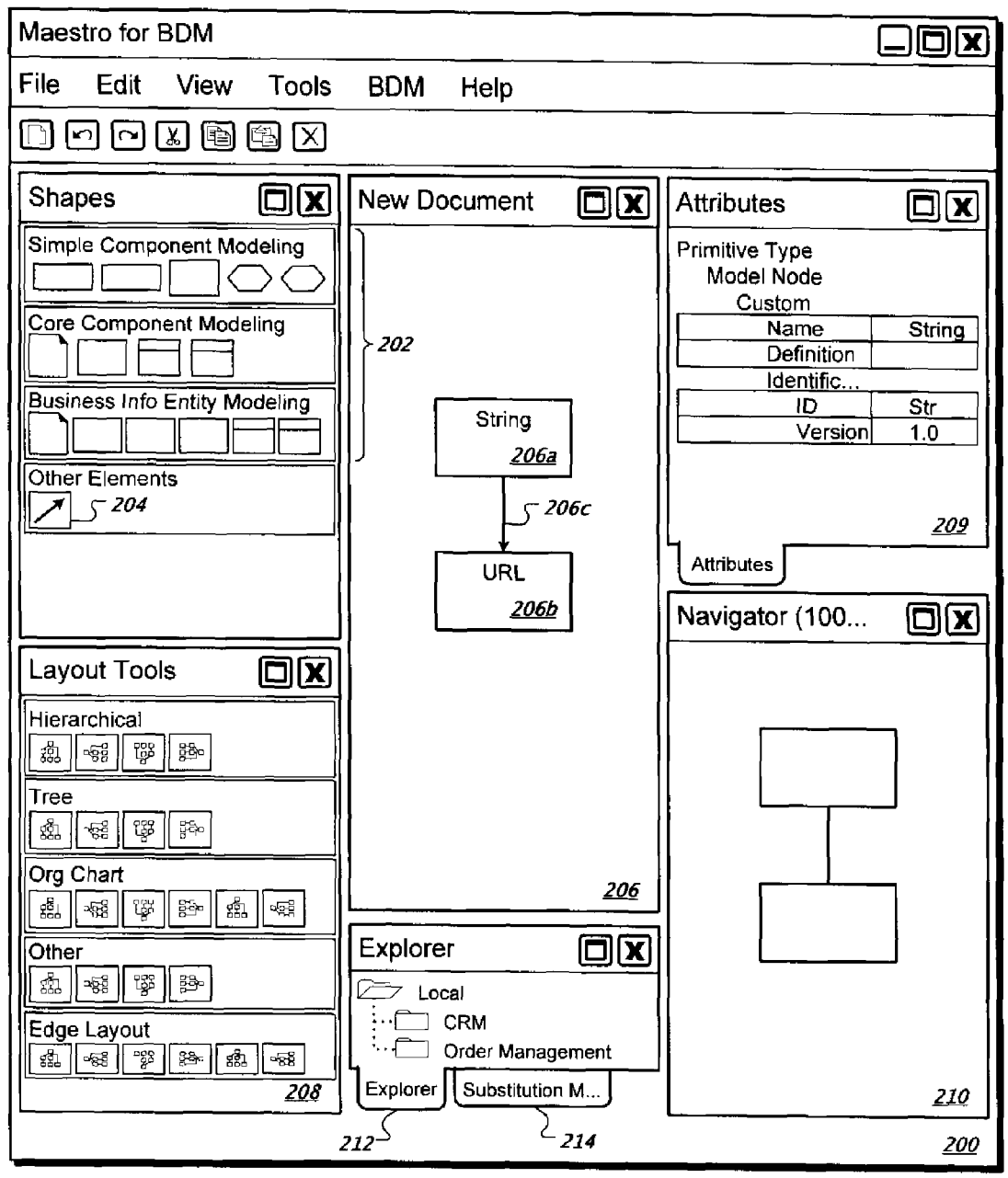
FIG. 2 is an example of a graphical user interface for generating a business document model.

FIG. 2 shows an example of a GUI 200 for generating a business document model. For example, the GUI can be generated by the modeling tool 114 (FIG. 1) to provide a graphical modeling environment. Here, the GUI 200 is generated in a window that is compatible with the Microsoft Windows operating system. The aspects of the modeling tool that generate the GUI (and optionally other aspects) can be programmed in Java. Also, the modeling tool generating the GUI 200 can use the Java-libraries provided by the Tensegrity Graph Framework as a foundation for displaying business document models. The layout of the nodes and edges can be defined in XML.

An area 202 in the GUI 200 shows the nodes of a business document graph, which can be selectively combined to make up a business document. The nodes are here initial, meaning that they remain generic and have not been specified by the user. The nodes are grouped in categories, such as nodes for modeling simple components and nodes for modeling business information entities, a context-specific variant of the core components introduced by CCTS. The nodes in the area 202 can be maintained and generated for display by the node manager 114a (FIG. 1).

The GUI includes one or more edge icons 204 under the node area 202. The edge icons can be managed and generated for display by the edge manager 114b (FIG. 1). Here, there is a single edge icon shown that represents all possible edges in a business document graph. This means that the user does not have to distinguish between the different types of edges when generating the graph. Rather the edge manager 114b can determine the correct one based on the types of the source and target node.

The GUI here includes a modeling area 206 for associating selected nodes and edges with each other. For example, a user can drag nodes and edges and drop them in the area 206. There, the user can compose the building blocks to make up a business document model. For example, the selected edge can be associated with one or more nodes. The functionality of dragging and dropping nodes can be provided by an existing tool that interfaces with the modeling tool 114, such as the Tensegrity Graph Framework. Here, the user has selected a String node 206a and a universal resource locator (URL) node 206b and associated them with an edge 206c from the String node to the URL node. As noted earlier, the modeling tool can select the correct edge based on the source and target nodes. The semantic of the model so far is that the URL node will be used when the model is applied in a standard that recognizes the URL type, and that the String node can be used by any standard that does not recognize the URL type. The user can continue to add nodes, edges or both in the area 206 to further develop the model.

The GUI includes a layout area 208 where the user can choose between layouts for the directed graph of the model being generated. For example, the area 208 can let the user apply a layout algorithm that rearranges any of the nodes or edges to resemble a predefined layout. For example, the graph can be laid out in form of a hierarchy, a tree, an organization chart. Different layouts for edges can be used. Layout functions can be provided by an existing tool that interfaces with the modeling tool 114, such as the Tensegrity Graph Framework.

The nodes that can be selected from the area 202 are initial and can be specified using an attributes area 209. For any node selected in the modeling area 206, the user can edit the corresponding attribute(s) in the attributes area 209, for example to provide different attribute values. The attributes available for editing in the area 209 can be dynamically provided using the type of node that the user selects in the nodes area 202.

The GUI includes a navigator area 210 that shows an overview of the modeled graph and can for example let the user navigate through complex business document models. The navigator area 210 can be provided by an existing tool that interfaces with the modeling tool 114.

The GUI 200 here includes a control 212 for activating an explorer area and a control 214 for activating a substitution area. Examples of the explorer and substitution areas will be described below.

Figure 3:
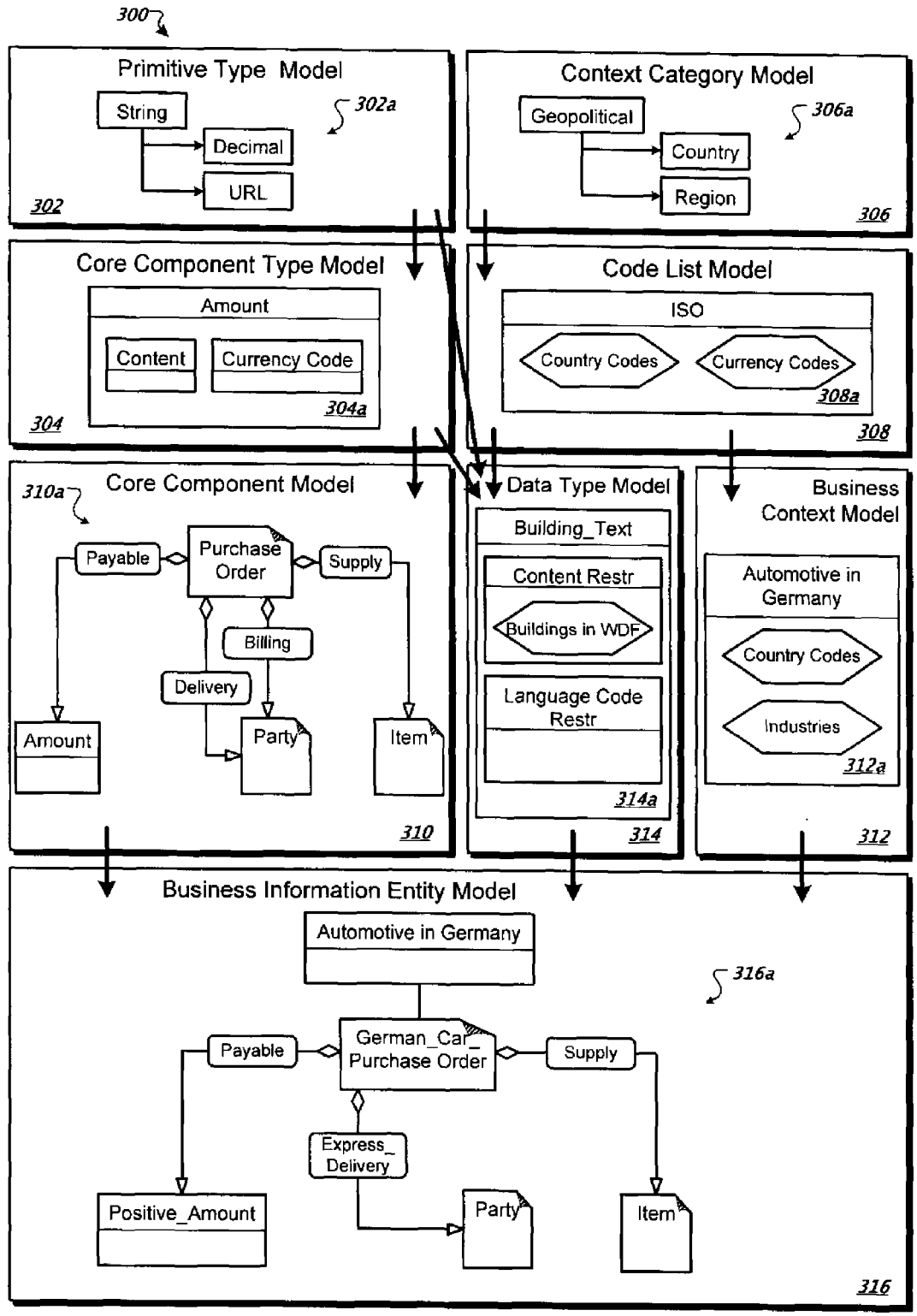
FIG. 3 are examples of nodes and edges that can be used in generating a business document model as a directed graph.

The nodes that can be included in the generated business document models can be modeled in any of several examples of submodels that will now be described. FIG. 3 schematically shows a model overview 300 that presents the different submodels of the current example. Generally, the types that make up the respective nodes can be modeled in the corresponding submodel. For example, primitive types can be modeled in a Primitive Type Model 302. Primitive models can be used to indirectly represent the data fields of business documents in one or more Core Component Type Models 304 (to be described). Context categories can be modeled in one or more Context Category Models 306 (to be described). The context categories can be referenced in every Code List Model 308 (to be described) to categorize the code values of code lists. Core component types can be modeled in the Core Component Type Models 304 and can be referenced in multiple Core Component Models 310, which define the structure of business documents. Core component types group data fields that carry data content and its semantic description. Code lists can be modeled in one or more of the Code List Models 308 and are used to provide context values for Business Context Models 312 (to be described) and to specify enumerations of values used to restrict data types in one or more Data Type Models 314 (to be described). The primitive types can restrict data types as well. The structure of a data type can be defined by the corresponding core component type from one of the Core Component Type Models 304. Variants of business documents are modeled in one or more Business Information Entity Models 316 (to be described). The building blocks of these variants are Business Information Entities in conformance with the CCTS, which in turn are variants of core components. Business contexts specify the business circumstances that lead to creating a new variant, and are referenced from one of the Business Context Models 312. Data types are referenced from one of the Data Type Models 314.

For example, in one implementation, primitive types, context categories, core component types, code lists and data types can be modeled once and thereafter used for all business documents. They can then be considered the basic building blocks of business documents. As an example, organizations can dynamically specify more of these basic building blocks. In some implementations, the set of basic building blocks can be relatively static because organizations define once which primitive types they want to use, for example. Later, more basic building blocks are defined only if a new requirement emerges. In an exemplary implementation, the actual work of business document modeling is to model the variants of business documents. This can in some instances be done with multiple Business Information Entity Models. If a new variant has a new structure, the appropriate edges can be added to the corresponding Core Component Model. Also, if a new aggregate business information entity is required, it can be necessary for the business document modeler to make sure that its template exists in a Core Component Model. Finally, in some implementations, business contexts should be assigned to every node in a Business Information Entity Model. They can be modeled separately in the Business Context Models. In some implementations, a business document modeler only has to work with three of the eight exemplary categories of business document models namely Business Information Entity Model 316, Core Component Model 310, and Business Context Model 312.

Exemplary details of the submodels 302-316 will now be discussed, beginning with the Primitive Type Model 302. All primitive types are modeled in a Primitive Type Model and are represented by nodes. These nodes can be connected by edges. An edge from a primitive type x to another primitive type y means that y can be substituted by x. When a modeled business document is exported to a specific standard, e.g. RosettaNet, that does not know the primitive type y, then x can be used instead. The specification of replacements deals with the problem that different standards support different primitive types. To make substitutions deterministic, every primitive type can have no more than one possible replacement and loops are not allowed, for example. The modeling of primitive types also includes the specification of several attributes, such as name and version.

For example, with regard to an illustrative model 302a, it can be noted that the semantic of this model is that if a standard such as XML-Schema knows the primitive type URL, this primitive type can be used to convey a URL in a business document. However, other standards might not know the primitive type URL, and these standards can use String instead. The same applies to Decimal.

Second, context categories classify the business circumstances that define a business context. For example, the business circumstance that a certain purchase order is only used in the automotive industry is classified in the category Industry. Context categories help to compare different business contexts. All context categories are represented by nodes. These nodes can be connected by edges defining a hierarchy of context categories. An edge from a context category x to another context category y means that y is a subcategory of x. Subcategories facilitate more precise categorization of business circumstances. Every context category can be the subcategory of at most one other context category and loops are not allowed, for example. The modeling of context categories also includes the specification of attributes, such as name or definition.

In an exemplary context category model 306a there is shown the context categories Geopolitical, Country and Region. Country and Region are subcategories of Geopolitical. These two subcategories facilitate distinction between a business circumstance that depends on the country or the region. Without these subcategories, country and region specifics would have been classified under Geopolitical, which would make the classification less precise.

Third, code lists are used to provide values for business contexts and to restrict the values of data types. All code lists are represented as nodes. The code values of a code list can be specified textually as one ore more attribute values. Code lists defined by the same code list authority can be grouped together by placing them inside a code list authority node. A code list authority can be an official standards organization like the International Organization for Standardization (ISO). As another example, any other organization or person can define its own code lists.

A code list is assigned to a context category for which it provides context values. Context values are used to specify business contexts. If a code list is not used to specify business contexts, it is not assigned to a context category. In some implementations, the assignment of a code list to a context category can be realized using an attribute value of the code list identifying the referenced code list node. In other implementations the assignment can be realized in another way.

With regard to an exemplary code list model 308, an item 308a represents the authority ISO that has issued Country Codes and Currency Codes. The code list Country Codes references the context category Country (subcategory of the context category Geopolitical). This reference may be realized using an attribute value. The assignment of Country Codes to Country means that the code values of Country Codes are elements of the context category Country. Examples of other code lists include, but are not limited to, a list of the building names at the headquarters of a major company.

Fourth, core component types specify the data fields of business documents. Rather than using primitive types directly for that purpose, a core component type groups multiple data fields together (each represented by a primitive type). There can be one primary data field, called content component, that carries the actual value. Additionally, there can be one or more data fields called supplementary components, that describe the value in the content component. This way, supplementary components can add a semantic meaning to the value in the content component.

Content and supplementary components are called core component type components because they are both components of a core component type. In the Core Component Type Model 304, core component type components are represented as nodes. For example, in some implementations, there is no visual difference between content and supplementary components. Rather, the core component type components can be provided with a type attribute (i.e., a core component type component type) to distinguish between the two. One content component and multiple supplementary components can be graphically grouped together by putting them into a core component type node. Core component types have attributes, for example name, definition and synonym names, to avoid multiple components being created that have synonymous names. Core component type components have attributes such as name and the primitive type that the component is based on.

An exemplary core component type 304a is Amount, and it has one content component and one supplementary component. The content component carries the actual currency value, for example 12. The supplementary component Currency Code specifies the currency code, for example EUR (for Euro).

Fifth, all core components except the core component type components are modeled in the Core Component Model(s)

310. Aggregate core components aggregate other core components. This determines the hierarchical structure of a business document. Core component types declare the actual data fields of business documents. Core component types are modeled in the Core Component Type Models 304. Therefore, core component types need not be modeled again and can be referenced instead. Core component type references and aggregate core components are represented as nodes.

The assignments of child core components to parent aggregate core components are represented by edges. For example, an association core component is an edge connecting two aggregation core components, whereas a basic core component connects an aggregation core component with a core component type. Association core components and basic core components can be labeled with a property term specifying the reuse of the child core component. Additionally, property terms distinguish between multiple edges with the same parent and child node. This can provide an advantage over tree based approaches because one node can be reused with a different semantic each time.

An exemplary core component model 310a includes a purchase order. Here, the purchase order, party and item nodes are aggregation core components and an amount node is a core component type reference. This means that amount is a reference to a core component type that was already modeled in a Core Component Type Model 304. The properties of the purchase order are payable-amount, delivery-party, billing-party, and supply-item. The property terms delivery and billing distinguish the twofold reuse of party. That is, party is used first as the party that the ordered items should be sent to and second as the party that receives the bill. For clarity, the properties of party and item are not shown.

For example, a core component type reference should not have any outgoing edges because the referenced core component type is modeled separately in a Core Component Type Model. Apart from this constraint, loops can be allowed in Core Component Models 310. For example, the aggregate core component party is a child of the purchase order in the model 310a. In another business document, however, a party with all its current purchase orders could be modeled. In this case, purchase order can be the child of party. Because the same building blocks are used in both business documents, purchase order can be both the parent and the child of party. More complex loops can be allowed. When instantiating a business document (e.g., filling it with values) it should be ensured that such recursions terminate. Aggregate core components can include the same attributes as core component types.

Sixth, a business context describes the business circumstances, for example industry and geopolitical region, in which a variant of a business document is to be used. These business circumstances are specified by an enumeration of context values. Context values are code values of a code list that is categorized in one of the context categories modeled in the Context Category Model 306. The categorization of context values into different context categories can make it easier to compare different business contexts. Moreover, context values can be assigned to a business context in two steps. Firstly, all code lists that define the necessary context values are grouped together and placed in a business context node. Because code lists are already modeled in Code List Models 308, they need not be modeled again and can be referenced instead. Hence, code lists in a Business Context Model 312 can be represented as code list reference nodes. Secondly, all required code values of the grouped code lists are selected. The selected code values are the context values specifying the business context. Because the code values of a code list can have a hierarchical structure, it is possible to select a complete sub-tree. Modeling a business context can also include specifying attributes.

An exemplary business context 312a is called Automotive in Germany and can be specified with two context values: one specifying the country Germany, the other specifying the automotive industry. These two context values are defined by code lists respectively. The code lists country codes and industries are grouped by the business context Automotive in Germany. To assign the context value Germany (DE) to the business context, the according code value of the code list Country Codes can be selected. For the business context Europe, it is possible to select the context value EU instead of selecting every single European country.

Seventh, a data type is similar to a core component type. Both represent the data fields of a business document. Core component types do this in a generic way by grouping content and supplementary components that correspond to actual data fields. Data types are more precise in representing these data fields. For example, every data type can be based on a core component type and can specify one data type restriction for each content and supplementary component of the core component type. As a result, a data type and the corresponding core component type have the same structure. Multiple data types can be based on the same core component type. A data type restriction limits the possible values of a content or supplementary component. For example, value range and length can be restricted. Also, a regular expression and an enumeration of allowed values can be specified.

In an example of a data type 314a, a Building_Text is a data type. Data types group data type restrictions, which in turn group code list references. Here, Language Code Restriction is a data type restriction. Also, Buildings in WDF is a code list reference. Analogously to selecting context values for business contexts, code values of a code list can be selected. These selected code values are an enumeration of allowed values for the restricted content or supplementary component. A data type can be assigned to a corresponding core component type by specifying the core component type in an attribute value of the CC ID attribute.

The core component type component that is restricted by the data type restriction is specified through the identifier of the core component type component in one of the attributes of the data type restriction. As another example, if the primitive type of a core component type component is decimal, a data type restriction can further restrict it to Integer.

Eighth, a business information entity is a variant of a core component. There can be many variants based on the same core component. For example, a business information entity can be created from a core component by applying a business context. The process of applying a business context can include three steps. Firstly, a business context is assigned to a business information entity specifying the business circumstances such as country and industry in which the variant is used. Secondly, the required properties for the business information entity are selected from the set of properties specified by the corresponding core component. Thus, the properties of a business information entity are a subset of the properties specified by the core component it is based upon. This selection of required properties depends on the assigned business context. For example, some properties of a purchase order in the automotive industry in Germany can differ from the ones of a purchase order in the software industry in the United States. However, both variants can be based on the same generic template of a purchase order. Thirdly, business information entities are qualified to distinguish between different variants based on the same core component. A qualifier can be a string that briefly describes one or more aspects of a business context followed by an underscore. The unique name of a business information entity can be a concatenation of zero or more qualifiers and the name of the corresponding core component. If no business context is assigned to a business information entity, this means that the business information entity can be used in any business circumstance. In such a case no qualification is required.

For example, Germany_Address and US_Address can be business information entities that are variants of the core component called Address. Both variants have a different business context, which influences the selection of properties. In Germany, addresses do not have a state attribute as they do in the United States. Both variants are here qualified with a description of the business context. The variant Germany-_Address has the qualifier Germany to indicate that it is used in Germany. The same principle applies to US_Address and the qualifier US. The qualifiers Germany and US distinguish the two variants from each other and also distinguish them from the generic template Address. Business information entities can be modeled similarly to core components. As the name indicates, aggregate business information entities aggregate other business information entities. This determines the hierarchical structure of a variant of a business document. The actual data fields of business document variants are specified by data types. Data types can be modeled in the Data Type Models 314. Then, data types need not be modeled again and can be referenced instead. Data type references and aggregate business information entities are represented as nodes in the Business Information Entity Models 316.

The assignments of child business information entities to parent business information entities are represented by edges. An association business information entity is an edge connecting two aggregate business information entities, whereas a basic business information entity connects an aggregate business information entity with a data type. Association business information entities and basic business information entities are labeled with one or more qualifiers, each followed by an underscore, concatenated with the property term of the association core component or basic core component they are based on.

Business contexts can be modeled in the Business Context Models 312. Then, they can be referenced instead of being modeled again. Business context references are represented as nodes and are assigned to one or more aggregate business information entities by simple edges.

An example of a business information entity 316a includes a German_Car_Purchase Order that is a variant of the core component Purchase Order. German_Car_Purchase Order is the variant used in Germany for the automotive industry as specified by the business context Automotive in Germany. The qualifiers German and Car relate to Purchase Order Hence, the semantic is that this is a purchase order used in Germany and in the automotive industry. It does not, for example, mean that a German car is purchased. German_Car-_Purchase Order has the properties Payable-Positive_Amount, Express_Delivery-Party, and Supply-Item. The property Billing-Party is excluded because it is assumed that the party that gets the car also receives the bill.

The data type Positive_Amount restricts the values of the core component type Amount to positive values. This is textually indicated by the qualifier Positive. No business context is here assigned to Positive_Amount because it can be used independently of any business context. However, it is possible to do so for data types that are specific to a business context. For example, the representation of a binary value differs between big and little endian depending on the operating system. The used operating system is a business circumstance that can be described by a business context using the context category System Capabilities. The context category System Capabilities is one of the eight context categories used with CCTS.

The aggregate business information entities Party and Item here have no assigned business contexts. Therefore, they do not have to be qualified. In this example, the association business information entity Express_Delivery is here the only qualified edge. The qualifier Express is meant to indicate that the Delivery-Party should receive the purchased items very soon. In practice, qualification may not be common in conjunction with edges but it can be very important for aggregate business information entities.

Aggregate business information entities can include the same attributes as data types. Every business information entity is based on a core component whose variant it represents. This applies not only for aggregate business information entities, which are represented by nodes, but is also valid for edges. Basic business information entities and association business information entities are edges in the Business Information Entity Models 316. They are based on basic core components and association core components, respectively. The latter are edges in the Core Component Models 310. As a result, all business information entities include the core component ID attribute to reference the core component(s) they are based on.

Figures 4, 5:
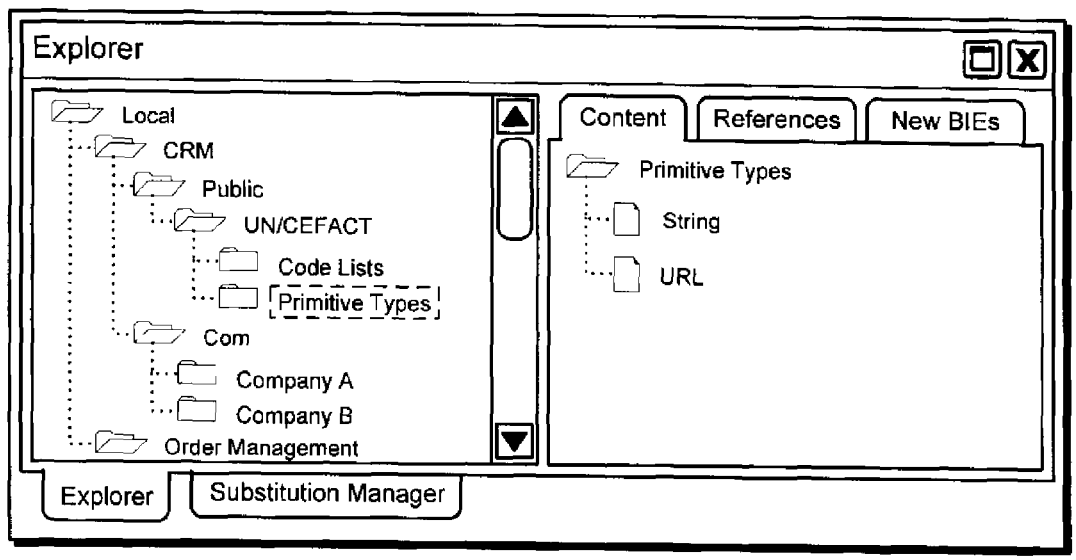
FIG. 4 is an example of an explorer area that can be presented in the graphical user interface of FIG. 2.
FIG. 5 is an example of a substitution area that can be presented in the graphical user interface of FIG. 2.

With reference briefly to FIG. 2, there will now be described an example involving the explorer control 212. Upon the user activating this control, an area 400 as shown in FIG. 4 can be presented in the GUI 200. The explorer area 400 can be minimized, resized or maximized, to name some examples. The explorer area provides access to one or more repositories, their databases and folders. The folder structure is here displayed on the left in the area 400 and the folder contents on the right. The folder contents are building blocks that are stored in the selected folder. These building blocks can be dragged from the repository and dropped in the modeling area 206. Similarly, the explorer area provides access to references of building blocks, initial business information entities and initial data types. Thus, the explorer area 400 provides access to preexisting nodes that have already been specified, for example so that the user can navigate among them. For example, the area 400 can be generated by the repository manager 114d (FIG. 1).

With reference again briefly to FIG. 2, there will now be described an example involving the substitution control 214. The following operations can be performed by the substitution manager 114e (FIG. 1). Upon the user activating this control, an area 500 as shown in FIG. 5 can be presented in the GUI 200. The area 500 presents possible substitutes to the user, here in form of rows of a table. The columns contain the attribute values of the building blocks that are presented as substitutes. The results are sorted by their quality, here ranging between 0 and 100. The quality equals 100 if the selected building block is known with its identifier. The user can replace a selected building block in the modeling area 206 with a substitute by double-clicking on it. As another example, the user can drag a substitute and drop it in the modeling area.

Figure 6:
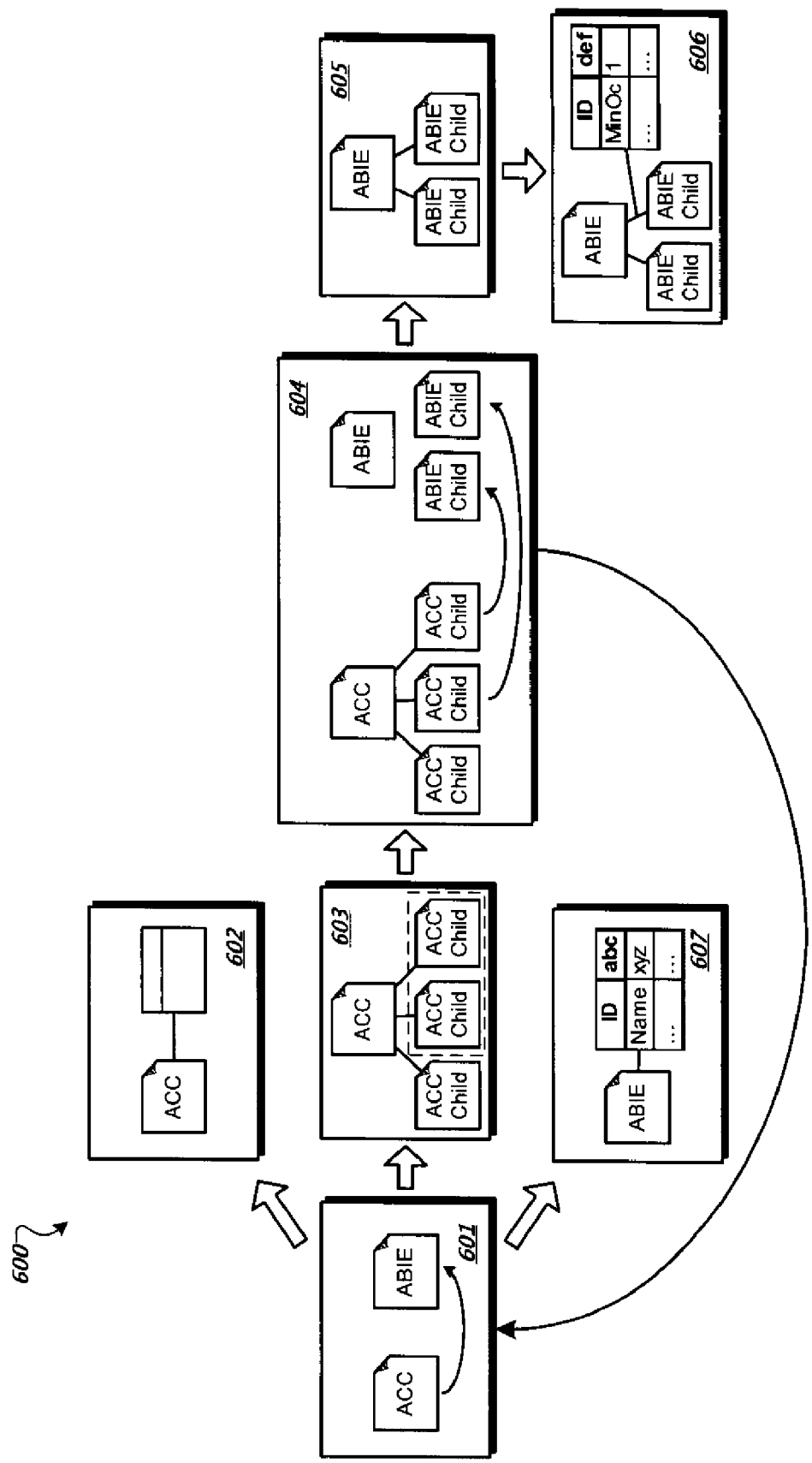
FIG. 6 is an example of a procedure for creating a variant.

The three steps of applying a business context to create a business information entity from a core component include: assigning a business context, selecting properties, and qualifying the business information entity name. However, the properties of a business information entity are also business information entities. These properties are variants of core components as well and must be created before they can be used as properties. Therefore, FIG. 6 shows an example of a recursive algorithm 600 that can be a guideline to the business document modeler. The input parameter for this algorithm is the aggregate core component for which a variant is to be created. The algorithm can begin in step 601 with creating an initial aggregate business information entity that is based on the given aggregate core component. An initial aggregate business information entity has no properties. In other words, no child node is here assigned to the newly created aggregate business information entity. A business context is assigned to the newly created aggregate business information entity in step 602. The required properties are selected from the set of properties specified by the aggregate core component in step 603. These properties are all core components. An example of a property is Delivery-Address. For all of the selected properties the following is done in step 604: If a suitable variant of the node representing the property already exists, reuse this building block. For example, this is the case for all data types since they are already modeled in one or more of the Data Type Models 314. If no suitable variant exists, create one by going to step 601. This can be a recursive call. In step 605, all nodes that either were reused or newly created in step 604 are connected with their parent aggregate business information entity that was created in step 601. Each one of these edges is either a new association core component or a new basic core component. In step 606, specify the attribute values of the newly created edges, such as the cardinality. In step 607, specify the attribute values of the aggregate business information entity that was created in step 601, for example Qualifier.

Some or all steps of the algorithm 600 involve the modeling tool 114. For example, any or all of the steps can be supported by the visual presentations made in the GUI 200 (FIG. 2). Modifications to the algorithm 600 can be done. For example, the order of the execution of steps 602, 603 and 607 is arbitrary.

Figure 7:
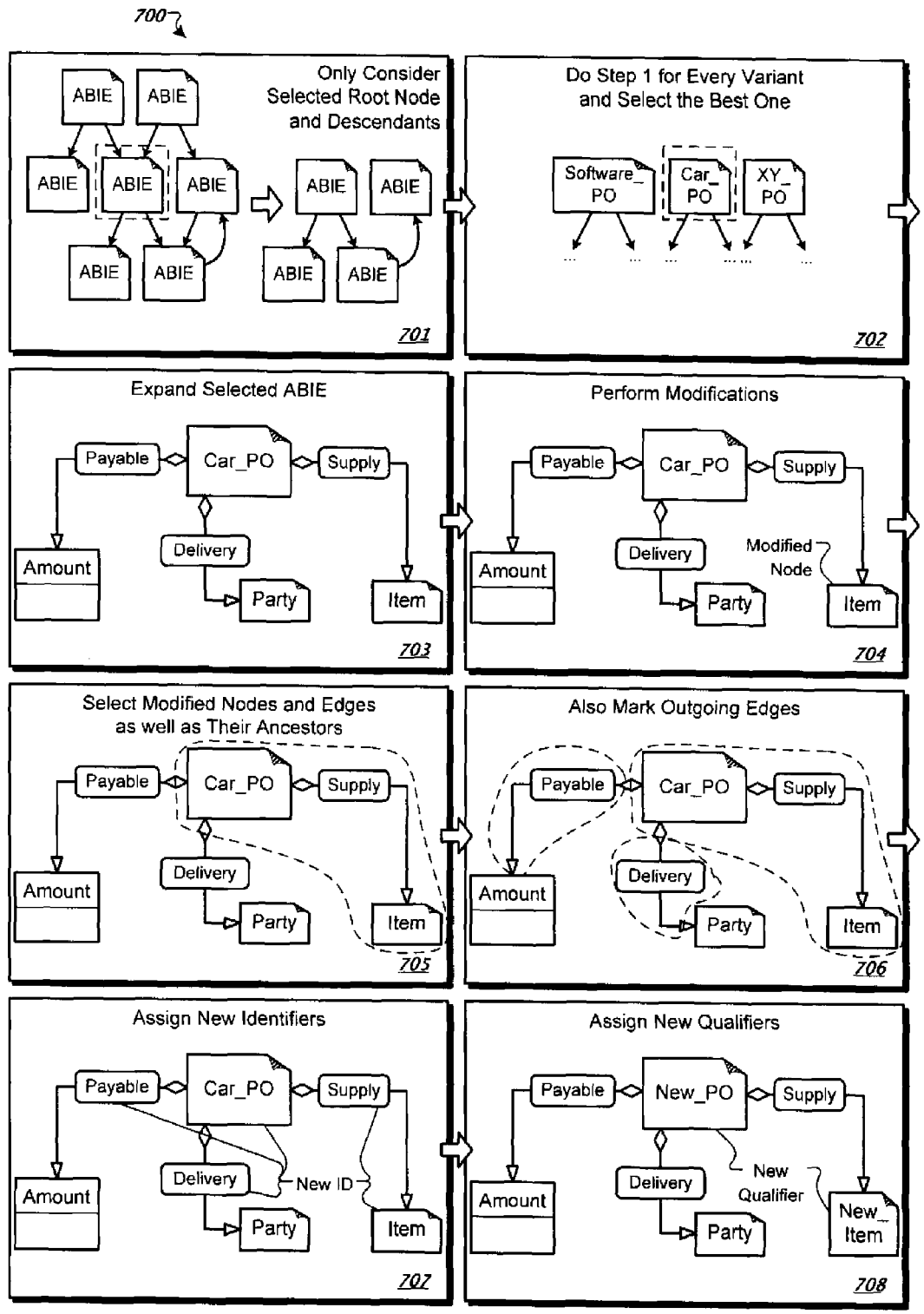
FIG. 7 is another example of a procedure for creating a variant.

If one or more Business Information Entity Models 316 already exist, it can be relatively easy to create a new variant. That is, rather than assembling a complete Business Information Entity Model from scratch, it is possible to take an existing model, perform changes to this model, and store it as a new variant of a business document. FIG. 7 shows an example of an algorithm 700 that describes how a business document modeler can create a new variant of an existing variant. In step 701, Business Information Entity Models are shown as graphs and not trees because cycles are allowed. Consequently, these models do not have a root node. Nevertheless, business documents possess a hierarchical structure. The business document modeler selects one node in this structure that represents the variant of a business document. Since a data type on its own is no business document, this root node should be an aggregate business information entity. For example, Software_PO is a single building block but solely represents one variant of a purchase order. The substructure of an aggregate business information entity is specified by its descendant building blocks and thereby defines the characteristics of the variant of a business document. Subsequently, only the descendants of the selected node are considered. The resulting sub-graph is still not a tree. Nevertheless, the selected node is called root node because semantically it is at the top of the hierarchy. In other words, per definition by the business document modeler, one node in the business document model is the root node, although loops are allowed.

In step 702, a choice is made of the root node of the Business Information Entity Model that is the closest match to the variant that is expected to be the outcome of this algorithm. This discovery can be supported by the substitution manager 114e. In step 703, the descendants of the root node are recursively expanded to span the Business Information Entity Model. In step 704, necessary changes are performed on nodes and edges. These changes can involve modifying one or more attributes, adding one or more new properties to an aggregate business information entity, removing one or more properties from an aggregate business information entity, and assigning a new respectively modified business context to an aggregate business information entity, to name a few examples. If a property is to be added that does not yet exist, one can be created.

In step 705, all modified nodes and edges as well as their ancestors are marked. This includes the root node. The ancestors should be marked as well because they were changed implicitly. If a child is modified, the parent is also changed. In step 706, all outgoing edges of all marked nodes are marked. The reason is that the marked nodes are modified building blocks that are stored as new ones in the next step. The outgoing edges are still used to connect the original building blocks with their children. Hence, the new building blocks should be connected to their children with new edges. In step 706, all outgoing edges of the node Item should be marked as well. These edges and the corresponding child nodes are not displayed here for clarity.

In step 707, new identifiers are assigned to all marked nodes and edges. In every case, the ID attribute of the root node can be changed. In step 708, a new qualifier is assigned to all nodes with a new identifier because names should be unique to be able to distinguish different variants of building blocks. This does not apply for edges since they are already distinguished by distinct parent and child nodes.

The nodes and edges with new identifiers are new building blocks. The information from which building blocks these nodes and edges were created can be lost. For example, it may be known only that the original and the new building block are based on the same core component. Unchanged nodes and edges can be reused and shared between existing and new variants. For example, the complete substructure of Party can be reused. The expansion of a node (step 703) can be automatic. The same applies to the identification of explicitly and implicitly modified building blocks and the assignment of new identifiers to them (steps 705 to 707).

It was mentioned above that a user can access building blocks in a repository by browsing through the folder structure. For example, the user can select the right one and expand it to access the descendant nodes as well, if necessary. However, it can take some time to find the right building block, especially if the user must access many components of multiple business documents. This is one situation where the substitution manager 114e can be useful. The substitution manager can be an application component that provides possible substitutions for selected building blocks to the user. For example, when the business document modeler selects a building block, the substitution manager can automatically query the repository whether a similar component already exists. The best hits thus identified can be retrieved and be presented to the business document modeler. The user can then select the best match and replace the modeled building block with it.

One way for the substitution manager to find substitutions for a building block is to query the repository for building blocks that have the same attribute values. For example, if the user specified the name of the building block, the substitution manager can search for building blocks in the repository having the same name. In some implementations, all specified attributes for the building block are used in such a search.

Figure 8:
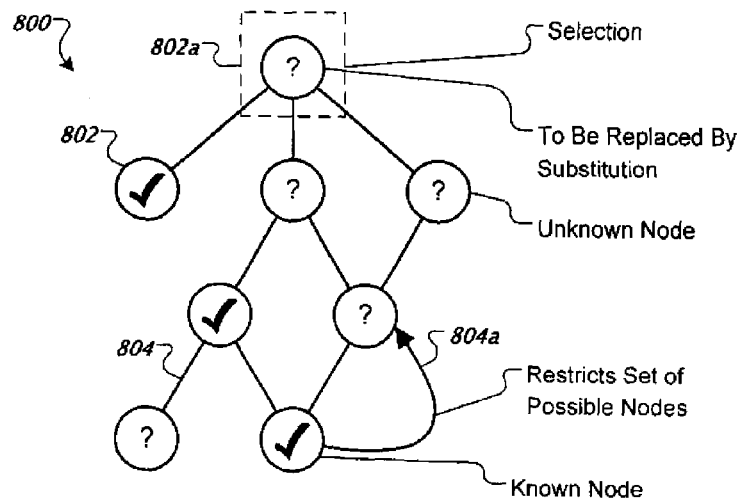
FIG. 8 schematically illustrates a node that is to be replaced with a substitute.

As another example, the substitution manager can use the information provided by the graph structure such as parent-child relationships or known ancestors and descendants. Assigned building blocks such as business contexts in a Business Information Entity Model can also provide relevant information for identifying substitutes. With reference now to FIG. 8, there is shown the general formalism that will be used in describing substitute identification. A graph 800 includes nodes 802, and edges 804 connecting the nodes. Generally, unknown nodes are labeled with question marks. Known nodes are labeled with checkmarks. The selected node 802a is to be replaced by a substitute. Based on the graph structure and the known nodes, unknown nodes are restricted 804a to a set of possible nodes that best fit to the given graph structure, given known nodes, and given attribute values.

One challenge of substitution management is that the structure of the business document model and the business document graph in the repository do not necessarily match. This leads to the problem that the substitution manager 114e cannot absolutely rely on the information given by the graph structure. For example, there are three reasons why the graph structure in a business document model might differ from the one in the repository. First, a new property could be assigned to a node in the business document model. That is, the user could have added a property to a node that otherwise corresponds to an existing node in the repository. Second, the business document modeler could make a mistake. For example, the user could have inadvertently (or purposely) assigned a particular node to what in the repository is its grandparent node. Third, the user could specify fewer than all properties of a node. For example, this could be because the user does not know the other properties or because the user does not wish to spend the time specifying them. This means that the substitution manager 114e (FIG. 1) in some implementations cannot absolutely rely on the graph structure that the user created, but rather will employ deductive approaches, such as heuristics or probability-based decision making, to infer which is the best matching substitute for a given selected component.

Figure 9:
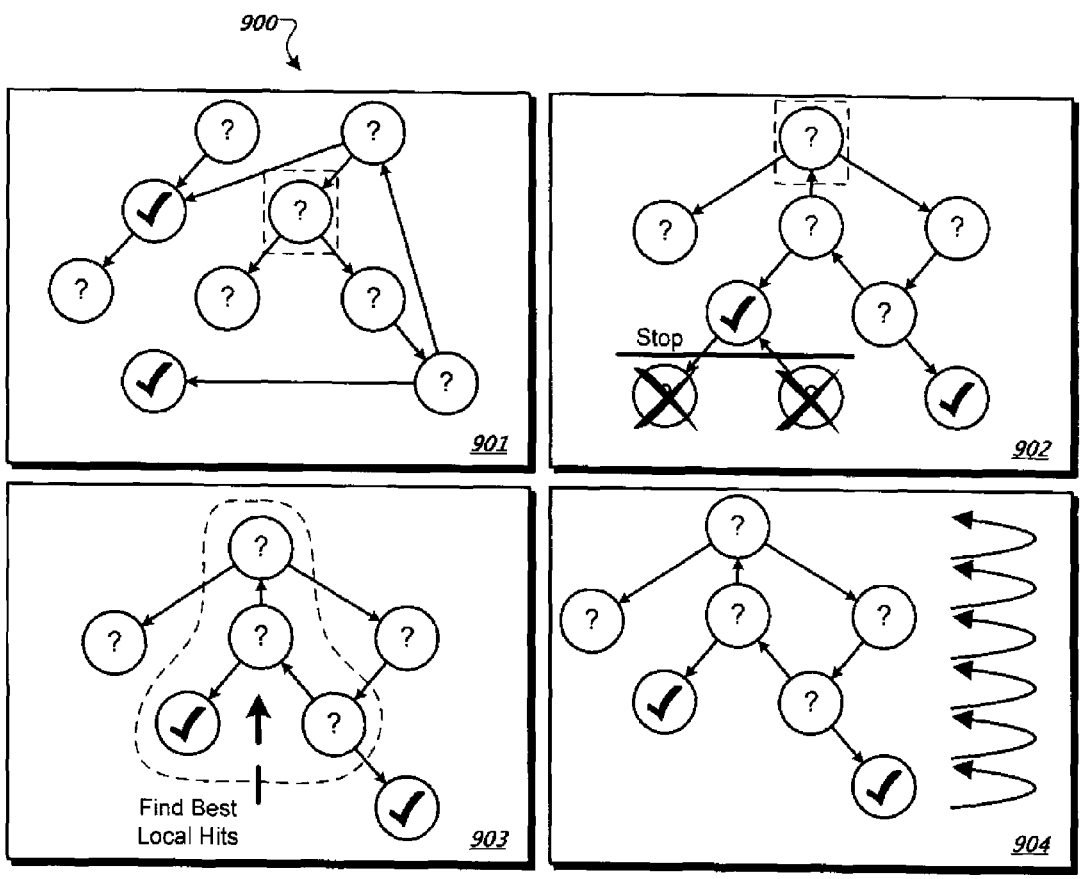
FIG. 9 schematically illustrates a substitution procedure.

With reference now to FIG. 9, there is shown an algorithm 900 for identifying a substitute. For example, the algorithm 900 can be performed using the substitution manager 114e. In step 901, the business document modeler selects any node or edge in the business document model that is to be replaced by a substitute. In this example, the user selects one of the nodes. In step 902, the graph is traversed starting from the selected building block. The following addresses the graphs shown in steps 901 and 902. In step 901 just any node in an arbitrary model is selected. In step 902, by contrast, there is shown the same graph but the nodes are arranged so that the nodes that are "nearer" to the selected building block are located above others. In some implementations, parent nodes and children nodes are traversed first, before the grandchildren and grandparents are traversed, and so on.

If a node is selected, the algorithm first visits ingoing and outgoing edges, then the nodes assigned to these edges, and so on. If an edge is selected, the algorithm first visits the assigned nodes, and so on. So far, parents and children are treated equally since both restrict a building block. This traversal makes sure that building blocks with a shorter distance to the selected building block are visited first. The reason is that the nearer a building block is to the selected node, the more restrictive it is. For example, the direct child of a node restricts more than any other descendant. The traversal is stopped if a node has neither a child nor a parent, which was not already visited. The traversal is also stopped if the identifier of a building block is known because this node or edge is uniquely identified and cannot be further restricted by an ancestor or descendant.

In step 903, the set of best matching substitutes is found, in the repository, for every unknown visited building block. That is, in this example, the algorithm can find several matching components for every traversed building block. Each component in such a set can be assigned individual quality value. In some implementations, this is done based on local information. Local information can include the attribute values of a building block and the relationship to parents and children. The graph structure beyond that realm can be ignored so far in such implementations. Depending on how many attribute values match and depending on given parent-child relationships, the quality of each match based on this local information can be calculated. In other implementations, the information used can include a larger realm, for example parent nodes and grandparent nodes, depending on the available computing resources.

In step 904, the graph is traversed backwards starting from the building block that was visited last. Step by step, the quality is adjusted of the set of local matches of parents and children with a shorter distance to the selected node. In this step the quality of matches for the selected building block are adjusted. For example, there can be set an initial quality value (e.g., zero) and that value can be adjusted one or more times as part of the matching process until a final quality value is obtained. In this example, the adjustment of quality values ends with the selected component. Thus, the quality value for the selected component (e.g., node or edge) can be adjusted based on the quality of the identified matches.

Thereafter, the substitutes for the selected node can be sorted by their assigned quality and presented to the business document modeler. For example, the area 500 (FIG. 5) shows quality values for identified substitutes. Then the business document modeler can select the correct substitute (optionally with guidance from the quality values) and replace the selected building block with it.

The algorithm 900 is not the only algorithm that can be used for substitution management. Depending on the computing power available, more precise algorithms are feasible.

It has been mentioned that business document models can be extended. For example, this can be done if new requirements arise. An extension can include adding one or more properties to any or all nodes. If there were only one organization that models business documents, this might be sufficient. However, when many organizations model and use business documents, the situation is different. For example, they can use the same building blocks for their business documents to improve the interoperability between businesses. Nevertheless, it is important that organizations can model their own business documents and make extensions that are not visible to others. The main reasons for this include: the need for confidentiality; that a building block is relevant only to the creating organization; the interest in keeping extensions private while they are being revised; and a requirement that public building-block repositories be harmonized.

An organization can keep a complete business document graph private. For example, the complete business document graph can be stored in a private repository that is not accessible for other parties. Nevertheless, a private business document graph can have components that are publicly defined. For example, an organization can model a private purchase order, but public building blocks like an address can be part of it. Rather than modeling these building blocks again, an existing business document graph can be extended. The extension can be stored in a private namespace to keep them hidden from others. The extension can be moved to a public namespace and committed to a public repository if the organization wants to make the private extension public. A reason for that could be that a private extension becomes a best practice in the industry and therefore draws attention of other organizations.

Figure 10:
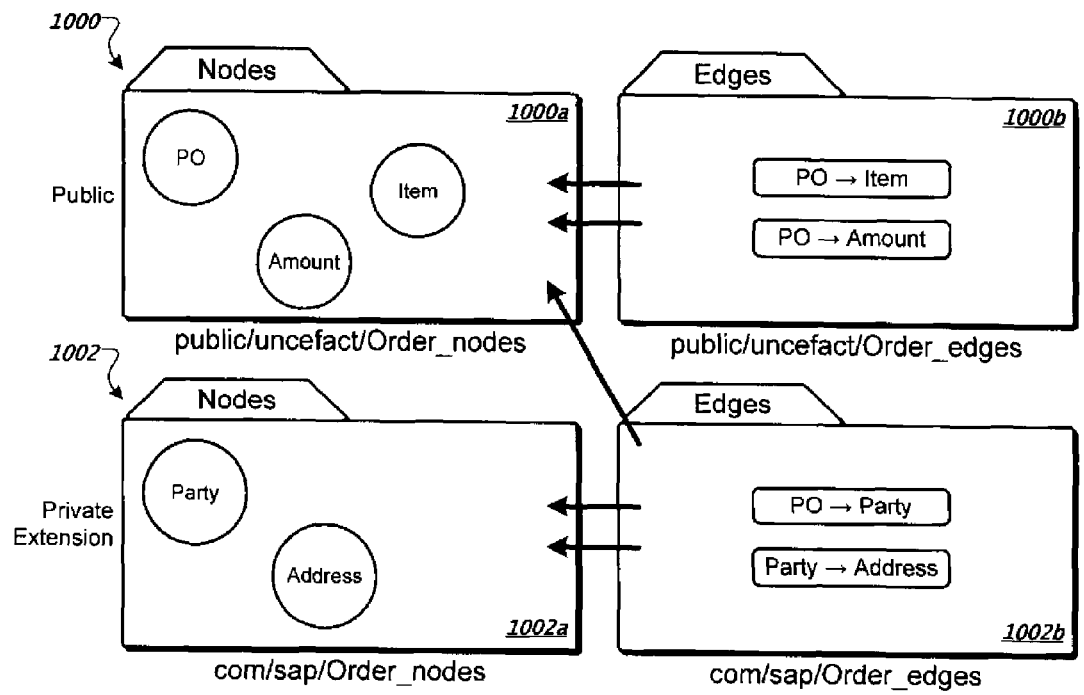
FIG. 10 shows an extension generated from a model in a repository.

With reference now to FIG. 10, there is shown building blocks Purchase Order (PO), Amount and Item in a public part of a repository 1000. Particularly, the nodes are stored in a public nodes folder 1000a and the corresponding edges are stored in a public edge folder 1000b. An extension to the model in the public repository is stored in a private part of a repository 1002. Particularly, Party and Address nodes are stored in a private nodes folder 1002a. Similarly, an edge from the (public) PO node to the Party node, and an edge from the (private) Party node to the Address node, are stored in a private edge folder 1002b. These folders can use equivalent namespaces. As a result, the extension can only be seen in the private namespace. For clarity, an extension to the model in the public part of the repository can be stored in a private part of a repository. This repository can be the same as, or a different one from, the one that holds the public part of the repository.

The systems and techniques for business document modeling presented herein are generic because they do not depend on syntax and hence are independent of any standard-specific representation of business documents. That is, rather than describing how a business document is represented in a particular standard, it is here semantically defined by composing generic building blocks that make up the business document. This makes it possible to export the semantic model of a business document to one or more standards, for example UBL and RosettaNet.

Differences between standards that specify the syntax-representation of business documents seriously interfere with organizations' ability to interoperate with each other. The vision of a common modeling methodology is that mappings between different standards can be fully automatic if all business documents are based on the same semantic model. In practice, however, this is only possible to a certain extent.

One problem of mapping one business document standard to another is the differences in naming and structure depth. A different syntax itself is not a major issue, but problems arise due to the unknown semantic of a syntax-representation and because of differences in the semantics of multiple standards.

However, if a business document is modeled with a common modeling methodology, it can be exported to different syntax-representations while maintaining the same semantic in every instance. This way structure, naming and data fields of distinct syntax-representations can be identical although they are represented differently. One advantage of some systems and techniques for modeling presented herein is that the semantic of every building block is specified. This allows businesses to understand business documents other than their own. This is done using descriptions, qualifiers, property terms and business contexts, for example as described above. Mappings between standards that are based on the same semantic model can be realized between each other although they have a different syntax.

One limitation of some modeling methodologies is the incompatibility of existing business document libraries from different standards organizations. Almost every standard has its own library of business documents. Due to different structures, naming, and/or data fields it is likely that definitions of building blocks in one library are not compatible with components in another one.

For example, if a business document is exported into two different syntax representations that comply with the syntax specifications of the respective standards, it can happen that one of the libraries already specifies parts of the business document that are not compatible to the generic model. However, to be compliant to a standard it is necessary to use the existing library. As a result, the exported business document is not compatible with the standard. A mapping problem therefore arises between the generic model and the relevant standards.

Due to differences in the existing business document libraries, it can be difficult for a generic model to be applicable for multiple standards. However, an approach to address this problem can be to create a separate generic model for every standard. In other words, a business document can be modeled separately for every standard, to be compliant with the respective business document library. One advantage of such an approach is that a common modeling methodology can facilitate a common infrastructure. For example, the same modeling environment can be used for every relevant business document standard. That is, business documents or parts of them can be shared between two or more standards and can be reused for new business documents. Moreover, mappings between common parts of business documents can be simplified because they are based on the same generic model. This way, different requirements of various standards can be catered to and interoperability is improved.

Figure 11:
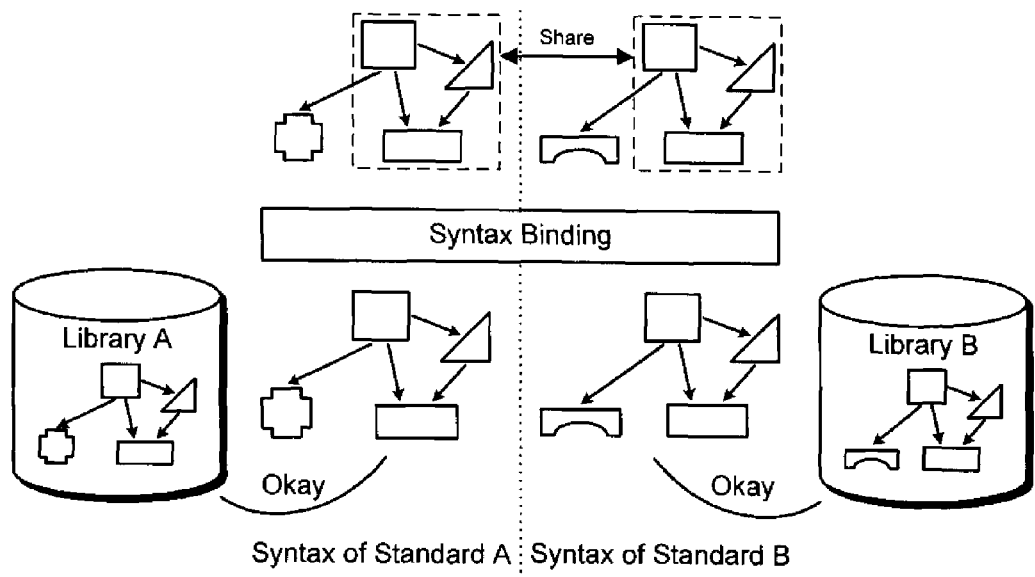
FIG. 11 shows separate generic models generated for two business document standards.

In the long run multiple standards organizations can consolidate their libraries step by step. There are two reasons for this. First, it is relatively easy to adapt a generic model from another standard because of the common infrastructure, in particular shared access to repositories. This is especially the case for new business documents because they cause little or no inconsistencies to existing libraries. Second, a best practice of one standard might force other standards organizations to use the same business documents because a broad user group demands it. FIG. 11 illustrates that the same modeling environment can be used for different business document standards, by modeling the business document separately for every standard to be compliant with the respective business document library. It is seen that the separate generic models for the standards have a shared portion, and that the differences can be articulated at the syntax-binding level to be consistent with the libraries.

Figure 12:
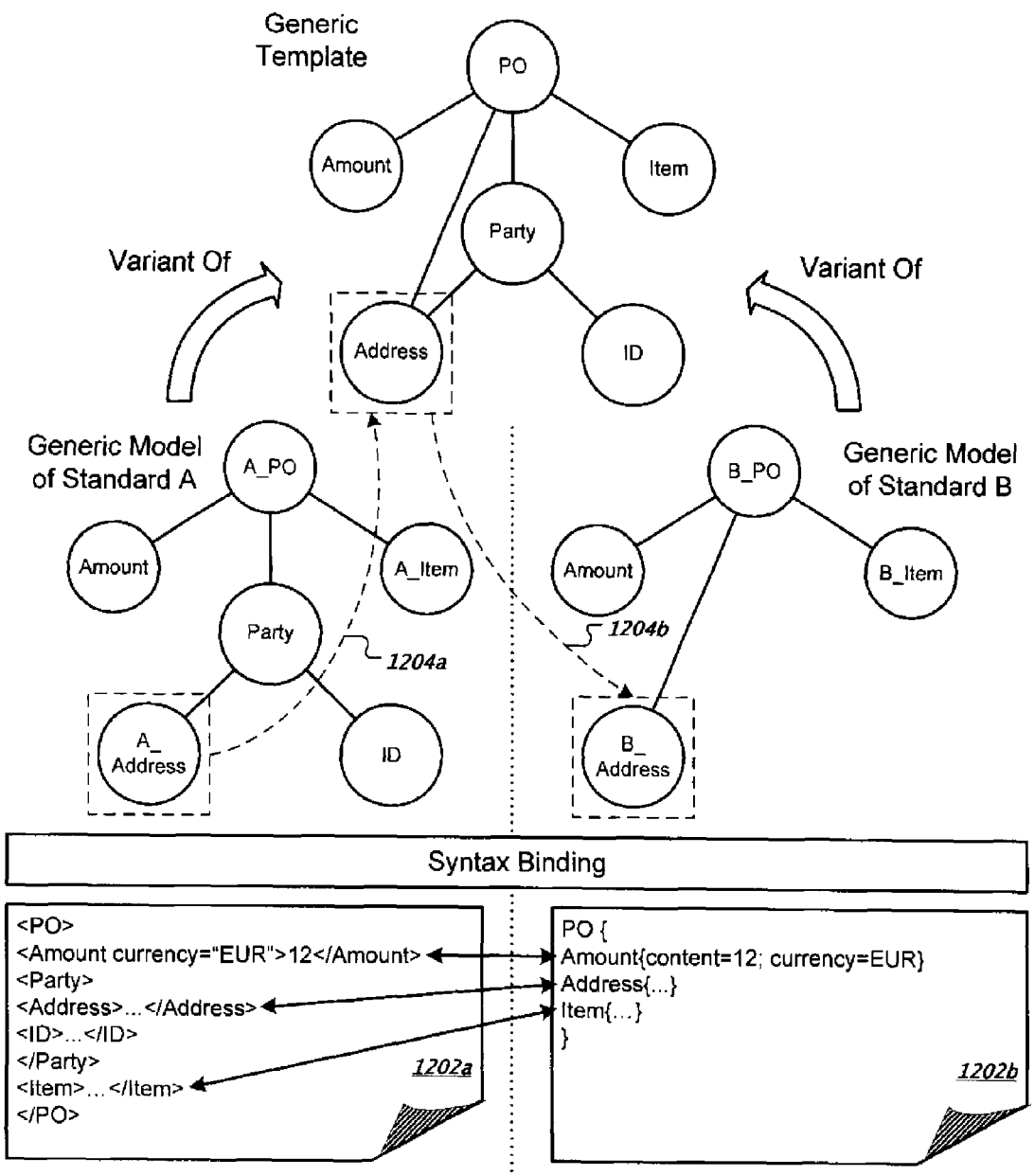
FIG. 12 is another example of separate generic models generated for two business document standards.

It has been mentioned that multiple generic models for different standards can share common building blocks. Moreover, variant handling can increase the number of building blocks that can be shared. It can also simplify mappings between standards. A business document, or a part of it, that differs between two or more syntax-representations only in terms of structure, can be modeled as a variant of a generic template. An example of this is illustrated in FIG. 12 that includes a graph 1200 and corresponding building blocks 1202a and 1202b of syntax representations for respective different standards. Here, implicit mappings are defined between building blocks that are based on the same generic template. The implicit mappings are here illustrated as dashed arrows 1204. Thus, a node A_Adr in the generic model of standard A is implicitly mapped (arrow 1204a) to a node Adr of the generic template. Similarly, the node Adr of the generic template is implicitly mapped (arrow 1204b) to the node B_Adr of the generic model of standard B.

For all building blocks that are not common to both standards the problem of data interoperability may remain unsolved. For example, the building block Party in FIG. 12 is not shared between standards A and B and it may therefore be unknown how to define a mapping between the standards for that building block. Another example is that building blocks can be named differently in distinct standards and hence it is also unknown how to define a mapping between these building blocks. One approach for such a situation could be to extend the modeling methodology with a variant handling mechanism that allows to create variants of core components that have different names.

Figure 13:
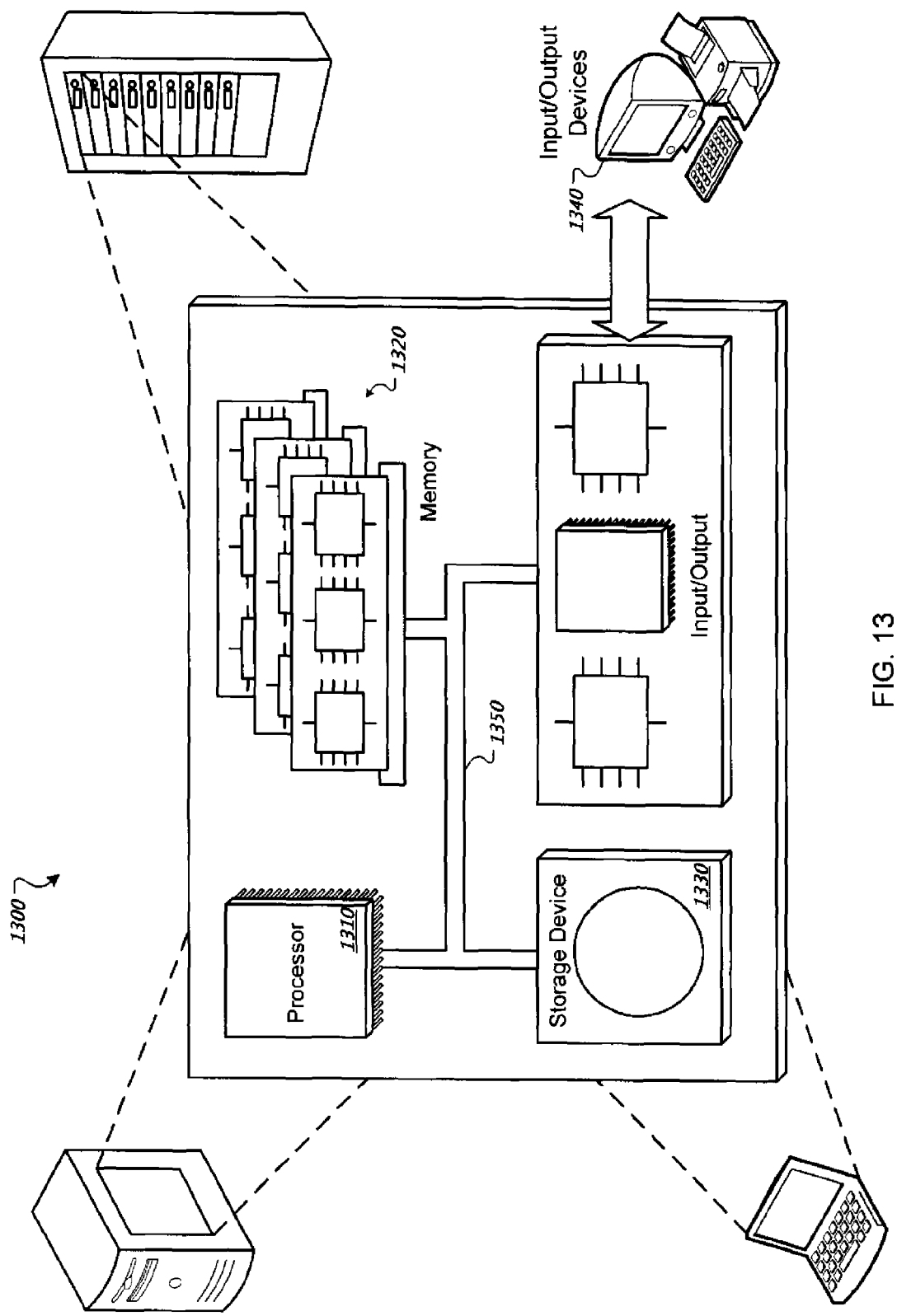
FIG. 13 is a block diagram of a computing system that can be used in connection with computer-implemented methods described in this document.

FIG. 13 is a schematic diagram of a generic computer system 1300. The system 1300 can be used for the operations described in association with any of the computer-implement methods described previously, according to one implementation. The system 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the system 1300. In one implementation, the memory 1320 is a computer-readable medium. In one implementation, the memory 1320 is a volatile memory unit. In another implementation, the memory 1320 is a non-volatile memory unit.

The storage device 1330 is capable of providing mass storage for the system 1300. In one implementation, the storage device 1330 is a computer-readable medium. In various different implementations, the storage device 1330 may be a floppy disk device, a hard disk device, an optical disk device, or a tape device.

The input/output device 1340 provides input/output operations for the system 1300. In one implementation, the input/output device 1340 includes a keyboard and/or pointing device. In another implementation, the input/output device 1340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A computer-implemented method for identifying a substitute relating to a business document model, the method comprising:

receiving, in a computer system that has a modeling tool, a first user input indicating one of multiple components of a business document model in the modeling tool, the business document model comprising a semantic model used in generating one or more documents to be exchanged in electronic communication, and the multiple components comprising nodes and edges that represent semantics of a business document, the edges connecting nodes;

identifying, in response to the first user input, at least one substitute component for the indicated component, the at least one substitute component being identified in a repository of preexisting business document models and using a graph structure of the business document model; and presenting the identified at least one substitute component in the modeling tool such that a user can replace the indicated component with the substitute component.

2. The computer-implemented method of claim 1, wherein a user creates the business document model in the modeling tool and makes the first user input by selecting the one of the multiple components, and wherein the identification of the at least one substitute component is automatically triggered by the selection.

3. The computer-implemented method of claim 1, wherein using the graph structure comprises traversing at least part of the business document model based on the indicated component and attempting to identify those of the multiple components encountered in the traversal.

4. The computer-implemented method of claim 3, further comprising terminating the traversal upon traversing a final component, the termination being based on a condition selected from the group consisting of: any parent or child component of the final component has already been traversed, and an identifier of the final block is known.

5. The computer-implemented method of claim 3, further comprising selecting a starting point for the traversal among the multiple components based on closeness to the indicated component in the graph structure.

6. The computer-implemented method of claim 3, wherein identifying the at least one substitute component includes identifying, for each traversed component, at least one best matching component in the repository.

7. The computer-implemented method of claim 6, wherein the at least one best matching component for at least one of the traversed components is identified using local information.

8. The computer-implemented method of claim 7, wherein the local information comprises an attribute value of the traversed component and a parent or child relationship of the traversed component.

9. The computer-implemented method of claim 6, further comprising adjusting quality values associated with the respective best matching components.

10. The computer-implemented method of claim 9, wherein the quality values are adjusted while again traversing the traversed components in reverse order.

11. The computer-implemented method of claim 9, further comprising adjusting a quality value for the substitute component based on a quality of the best matching components for the traversed components.

12. The computer-implemented method of claim 6, wherein an attribute of any of the traversed components is used in identifying the best matching components.

13. The computer-implemented method of claim 6, wherein the identification of at least one of the best matching components is performed after a determination that the graph structure does not exactly match a structure of the preexisting business models.

14. The computer-implemented method of claim 1, further comprising presenting a quality value with the substitute component, the quality value representing a determination of a quality of the substitute component as a replacement for the indicated component.

15. A computer program product tangibly embodied in a machine-readable storage device and comprising instructions that when executed by a processor perform a method for generating a business document model, the method comprising:
  receiving, in a computer system that has a modeling tool, a first user input indicating one of multiple components of a business document model in the modeling tool, the business document model comprising a semantic model used in generating one or more documents to be exchanged in electronic communication, and the multiple components comprising nodes and edges that represent semantics of a business document, the edges connecting nodes;
  identifying, in response to the first user input, at least one substitute component for the indicated component, the at least one substitute component being identified in a repository of preexisting business document models and using a graph structure of the business document model; and
  presenting the identified at least one substitute component in the modeling tool such that a user can replace the indicated component with the substitute component.

16. A computer program product tangibly embodied in a machine-readable storage device, the computer program product including instructions that, when executed, generate on a display device a graphical user interface for identifying a substitute relating to a business document model, the graphical user interface comprising:
  a modeling area configured to present multiple components of a business document model, the business document model comprising a semantic model used in generating one or more documents to be exchanged in electronic communication, and the multiple components comprising nodes and edges that represent semantics of a business document, the edges connecting nodes; and
  a substitution candidate area for presenting at least one substitute component such that a user can replace an indicated one of the multiple components in the business document model with the substitute component, the at least one substitute component being identified in a repository of preexisting business document models and using a graph structure of the business document model.

17. The computer program product of claim 16, wherein the substitution candidate area further is configured to present a quality value with the substitute component, the quality value representing a determination of a quality of the substitute component as a replacement for the indicated component.

* * * * *